May 24, 1927.
J. F. LINCOLN
1,629,876
END FRAME RING FOR MOTORS
Filed April 26, 1924
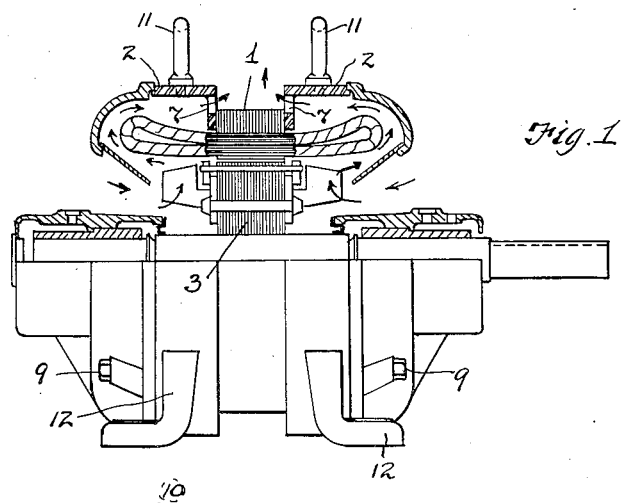
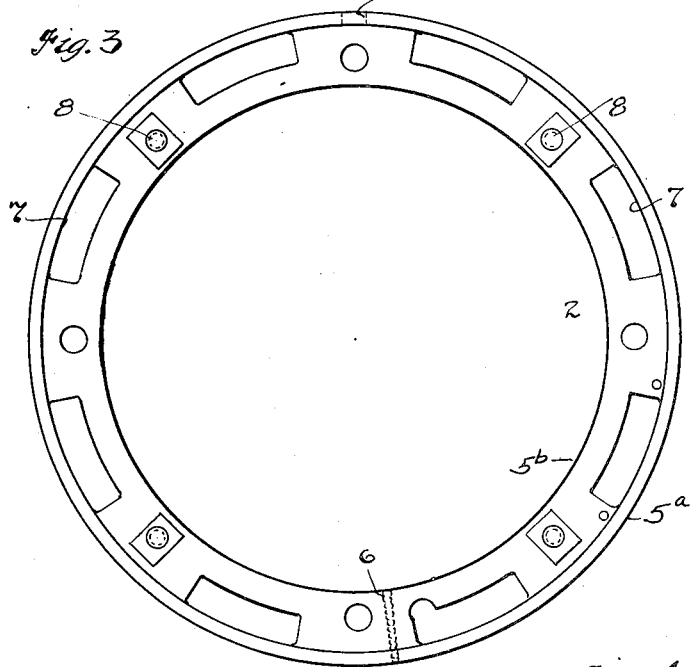
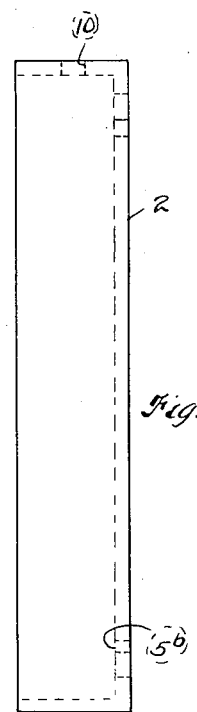
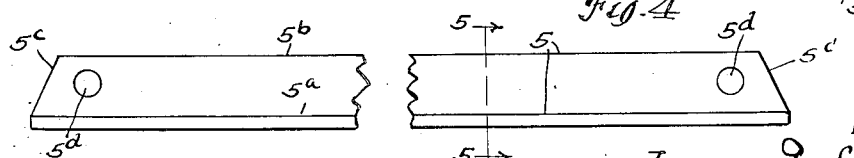
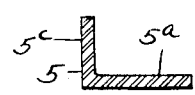
INVENTOR.
James F. Lincoln
BY
Fay, Oberlin & Fay
ATTORNEYS Patented May 24, 1927.

1,629,876

UNITED STATES PATENT OFFICE.

JAMES F. LINCOLN, OF CLEVELAND, OHIO, ASSIGNOR TO THE LINCOLN ELECTRIC COMPANY, OF CLEVELAND, OHIO, A CORPORATION OF OHIO.

END FRAME RING FOR MOTORS.

Application filed April 26, 1924. Serial No. 709,117.

In motors and similar electric machines, the universal practice heretofore, so far as I am aware, has been to make the frames or rings which hold the laminations of the stator together of cast iron. The object of the present invention is to provide a steel end frame for use in this connection in order to provide a strong and more dependable construction. At the same time the parts can be made of smaller dimensions, thereby permitting of some very important improvements in design.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is partly a side elevation and partly a central vertical section of a typical motor wherein my improved end frame rings have been employed; Fig. 2 is a side elevation and Fig. 3 an end plan view of one such ring by itself; while Fig. 4 is a plan view of the straight angle bar from which such end ring is fashioned; and Fig. 5 is a transverse section of such bar.

The only parts in the motor assembly shown in Fig. 1, to which attention need be directed in the present connection, are the stator 1 and the two end rings 2, one on each side of the stator, whereby the laminations composing the latter are held together and supported in proper position about the rotor 3.

As shown in Figs. 4 and 5, each end ring 2 is made from a straight steel angle bar 5, the one flange 5$^a$ of which is somewhat wider than the other flange 5$^b$. At the respective ends of the bar said flange 5$^b$ is beveled as shown at 5$^c$ (Fig. 4), so that when the bar is rolled into circular shape, the beveled faces 5$^c$ will contact on a radial line. To facilitate the bending of the angle into the desired circular shape and to retain the ends in proper abutting relation during the welding operation, a hole 5$^d$ is provided in the flange 5$^b$ adjacent each such end. The weld 6 (Fig. 3) is preferably effected by means of an electric arc, using an arc pencil of suitable metal to fill in any space that may be left due to imperfect fitting of the beveled faces 5$^c$ of flange 5$^b$ and the juxtaposed end faces of flange 5$^a$.

After the angle iron has thus been bent to circular form and its ends welded together, ventilating ducts 7 are drilled or otherwise formed in said flange 5$^b$ as well as bolt holes 8 through which pass the bolts 9 (see Fig. 1), whereby the assembled parts are held together. A hole 10 is similarly drilled or formed at one point in the flange 5$^a$ in which is inserted and fixed the base of a ring 11 whereby the motor may be lifted about, as found necessary. Feet 12, on which the motor is designed to rest, are finally welded at suitable oppositely spaced points on the flange 5$^a$ of each ring 2.

My improved steel end frame ring I have found eliminates the breakage experienced with cast iron in assembly and service. At the same time it is not only much stronger but decidedly less bulky than any equivalent cast iron structure, thus affording much less obstruction to passage of air through the motor by way of the ventilating passages 7, hereinbefore referred to. This ventilation is doubly effective because the steel end ring is in better proportion than it is possible to make a cast iron ring, no reinforcing webs being needed and the bulk being materially less so that a very free passage of air is permitted between the frame and coils.

A consequential saving in cost is also achieved, for not only, as pointed out above, is a saving effected in weight of metal employed, it being necessary to use only one-third to one-half as many pounds to do the same work, but the steel employed in my improved construction normally will cost less than half as much per pound as cast iron.

It will be understood that while I have described my improved end frame ring as being fabricated from a steel angle bar, structural steel of other cross-sectional forms may be similarly used to the same or nearly the same advantage.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a dynamo-electric machine, the combination with the annular laminated stator; of a supporting frame therefor, said frame including two end rings, each ring being made from an elongated structural steel member formed into a circle and having its ends welded together.

2. In a dynamo-electric machine, the combination with the annular laminated stator; of a supporting frame therefor, said frame including two end rings, each ring being made from an elongated structural steel member of angular cross-section formed into a circle and having its ends welded together, one portion of the member lying substantially in the plane of the ring and said stator being held between such portions of the two rings.

3. In a dynamo-electric machine, the combination with the annular laminated stator; of a supporting frame therefor, said frame including two end rings made from a steel angle bar formed into a circle and having its ends welded together with one flange of said bar constituting a cylindrical portion and the other a flat inwardly directed portion of the end-ring, and said stator being held between such flat portions of the two rings.

4. In a dynamo-electric machine, the combination with the annular laminated stator; of a supporting frame therefor, said frame including two end rings made from a steel angle bar formed into a circle and having its ends welded together with one flange of said bar constituting a cylindrical portion and the other a flat inwardly directed portion of the end ring, such cylindrical portions of the two end rings being directed outwardly and said stator being held between the juxtaposed flat portions of said end rings.

Signed by me this 24th day of April, 1924.

JAMES F. LINCOLN.